US012380884B2

(12) United States Patent
Wu et al.

(10) Patent No.: US 12,380,884 B2
(45) Date of Patent: Aug. 5, 2025

(54) VOICE-TO-TEXT DATA PROCESSING

(71) Applicant: CITRIX SYSTEMS, INC., Fort Lauderdale, FL (US)

(72) Inventors: Hao Wu, Jiangsu (CN); Taodong Lu, Jiangsu (CN); Yihong Wu, Jiangsu (CN)

(*) Notice: Subject to any disclaimer, the term of this patent is extended or adjusted under 35 U.S.C. 154(b) by 725 days.

(21) Appl. No.: 17/643,617

(22) Filed: Dec. 10, 2021

(65) Prior Publication Data

US 2023/0162731 A1 May 25, 2023

Related U.S. Application Data

(63) Continuation of application No. PCT/CN2021/132004, filed on Nov. 22, 2021.

(51) Int. Cl.
*G10L 15/22* (2006.01)
*G10L 15/02* (2006.01)
*G10L 15/30* (2013.01)

(52) U.S. Cl.
CPC .............. *G10L 15/22* (2013.01); *G10L 15/02* (2013.01); *G10L 15/30* (2013.01); *G10L 2015/025* (2013.01); *G10L 2015/223* (2013.01)

(58) Field of Classification Search
CPC .......... G10L 15/22; G10L 15/02; G10L 15/30
See application file for complete search history.

(56) References Cited

U.S. PATENT DOCUMENTS

| 6,230,129 B1 * | 5/2001 | Morin ..................... G10L 15/10 704/254 |
| 9,786,271 B1 * | 10/2017 | Combs ................... G10L 15/063 |
| 2005/0273327 A1 * | 12/2005 | Krishnan ............ G10L 19/0018 704/235 |

\* cited by examiner

*Primary Examiner* — Ibrahim Siddo

(57) ABSTRACT

A computing system includes a processor configured to convert a word spoken by a user into a pattern of symbols in response to an unsuccessful attempt to retrieve the word in a list. The pattern of symbols provide a visual representation of speech sounds identifying the contact in the contact list. The pattern of symbols of the converted contact is compared to a database of patterns, with the patterns in the database being in a format of symbols corresponding to the words in the list. Each pattern used in the compare has a match value assigned thereto based on being compared to the pattern of symbols of the converted word. The processor provides the word in the list corresponding to the pattern having the match value that is indicative of a match to the converted word.

20 Claims, 10 Drawing Sheets

Equation (1)　Similarity value per = [W_constant * S_constant] + [W_vowel * S_vowel] +
　　　　　　　　pronunciation section　　[W_next constant/vowel * [S_next constant/vowel]]

W = weight factor based on language pronunciation of the pattern
S = similarity value per letter

FIG. 8

Equation (2)　match value = $\sum_{1}^{N} \frac{\text{Similarity value per pronunciation section}}{N}$ N = number of pronunciation sections
　　in the converted word

FIG. 9

VOICE-TO-TEXT DATA PROCESSING

RELATED APPLICATIONS

This application is a continuation of PCT application serial no. PCT/CN2021/132004 filed Nov. 22, 2021, which is hereby incorporated herein in its entirety by reference.

TECHNICAL FIELD

The present disclosure relates to computing systems, and more particularly, to voice-to-text data processing.

BACKGROUND

In a typical work day, users may call or email an ever-increasing number of people using their computing devices. Speech recognition technology is leveraged today to improve operational performance of computing devices and improve the user experience with those devices.

Such devices implement speech recognition technologies to recognize and translate words spoken by users into text. In short, speech recognition enables a program to process human speech into a written format. Speech recognition enhances digital communications by reducing complexity and effort to perform such communications through the use of words spoken by users as a means of input to communicate.

SUMMARY

A method includes converting, based on rules, a word spoken by a user into a pattern of pronunciation symbols in response to an unsuccessful attempt to retrieve the word in a list. The pattern of pronunciation symbols provide a visual representation of speech sounds identifying the word in the list. The pattern of pronunciation symbols of the converted word are compared to a database of patterns, with the patterns in the database being in a format of pronunciation symbols corresponding to the words in the list. Each pattern used in the compare has a match value assigned thereto based on being compared to the pattern of pronunciation symbols of the converted word. The word in the list corresponding to the pattern having the match value that is indicative of The word spoken by the user may be converted into alphabet characters before converting into the pattern of pronunciation symbols. The unsuccessful attempt to retrieve the word in the list may be based on there not being a match between the alphabet characters representing the spoken word to alphabet characters representing the words in the list.

The method may further include ranking the match values assigned to the patterns used in the compare, and selecting the pattern having a highest ranked match value that exceeds a threshold.

The patterns in the database may include a plurality of multi-lingual patterns, with each language pattern in the multi-lingual patterns being based on a particular language pronunciation of the word in the list. Each word in the list may be represented by more than one language pattern.

The compare may start with a first one of language patterns having a particular language pronunciation, and in response to there not being a match, repeat the compare with a second one of the language patterns having a different particular language pronunciation.

In response to there being a match with one of the language patterns having a particular language pronunciation, the method may further include adding the language pattern providing the match to a custom pattern section in the database, and for a next time a word is spoken by the user for retrieval, starting the compare using the language pattern in the custom pattern section. In response to there not being a match with the language pattern in the custom pattern section, the compare is continued with the other language patterns in the database.

Performing the compare may include dividing the pattern of pronunciation symbols into pronunciation sections for the converted word, and dividing the pattern of pronunciation symbols into pronunciation sections for each pattern in the database used in the compare. The pronunciation sections for the converted word may then be compared to the corresponding pronunciation sections for each pattern used in the compare.

The matching value assigned to each pattern used in the compare may be based on a respective similarity value assigned to each pronunciation section. The matching value assigned to each pattern may be determined by adding the respective similarity values assigned to the pronunciation sections for the pattern, and dividing the added respective similarity values by a number of the pronunciation sections in the converted word.

Each pronunciation section may include a plurality of letters, and wherein the respective similarity value assigned to each pronunciation section for the pattern used in the compare is based determining a similarity value for each letter in the pronunciation section for the pattern used in the compare, and multiplying the similarity value for each letter in the pronunciation section by a respective weighting factor. The determined similarity value for each letter multiplied by the respective weighting factor are added together to determine the similarity value assigned to each pronunciation section.

The rules for converting the word into a pattern of pronunciation symbols may be based on an international phonetic alphabet (IPA). Retrieval of the word spoken may be initiated by the user in response to the user speaking a predetermined word.

Another aspect is directed to a computing device implementing the method as described above. The computing device includes a memory and a processor configured to cooperate with the memory. The processor is configured to convert, based on rules, a word spoken by a user into a pattern of pronunciation symbols in response to an unsuccessful attempt to retrieve the word in a list. The pattern of pronunciation symbols provides a visual representation of speech sounds identifying the word in the list. The pattern of pronunciation symbols of the converted word are compared to a database of patterns, with the patterns in the database being in a format of pronunciation symbols corresponding to the words in the list. Each pattern used in the compare has a match value assigned thereto based on being compared to the pattern of pronunciation symbols of the converted word. The word in the list corresponding to the pattern having the match value that is indicative of a match to the converted word is provided to the user.

Yet another aspect is directed to a non-transitory computer readable medium for a computing device, and with the non-transitory computer readable medium having a plurality of computer executable instructions for causing the computing device to perform steps as described above.

BRIEF DESCRIPTION OF THE DRAWINGS

FIG. 8 is an equation for determining a similarity value per pronunciation section for the example in FIG. 7.

FIG. 9 is an equation for determining the match value by adding together the similarity values per pronunciation section as determined with the equation in FIG. 8.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Speech recognition technology that converts spoken words to text typically uses a voice-to-text conversion. The effectiveness of speech recognition technology is often determined based on the accuracy of the translation of the spoken word (e.g., a word error rate). Several factors can adversely impact accuracy, such as pronunciation, accent, pitch, volume, etc. To improve the accuracy of speech recognition technology one or more of these factors need to be addressed. Otherwise, the technology becomes less useful in general, and in particular, the application of generated text by other technologies becomes very limited or non-existent.

Multi-lingual voice patterns may be used to improve voice-to-text data processing. The voice patterns for selected words in a list are pronounced in different languages. The voice patterns are based on patterns of symbols (e.g., pronunciation symbols) providing a visual representation of speech sounds identifying the words in the list. The use of different language patterns representing the words in the list improves the robustness of performing an action (e.g., retrieving a contact) regardless of the user's native language and any variations of the user pronouncing the word to be retrieved.

Figure 1:
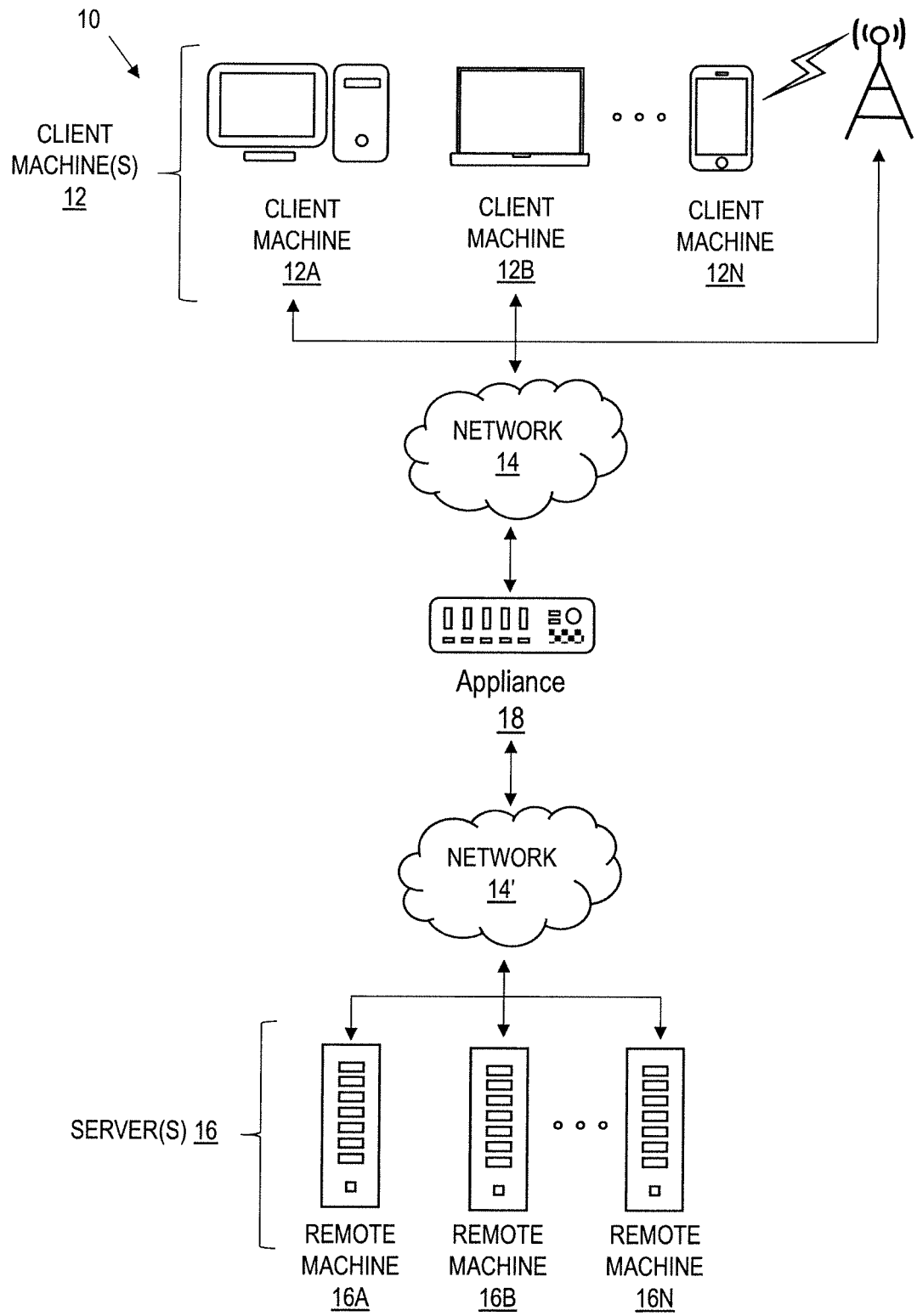
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'. In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
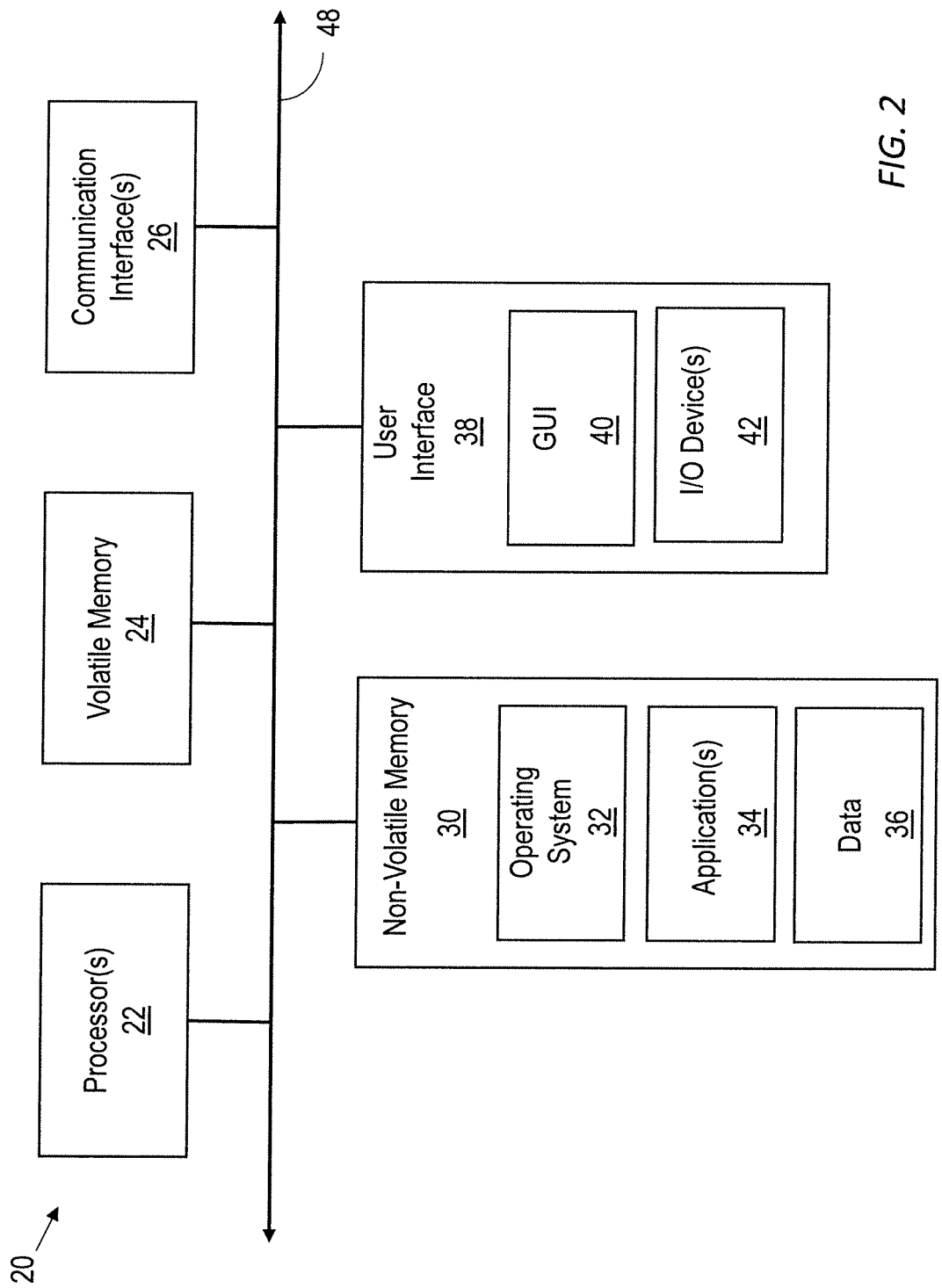
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
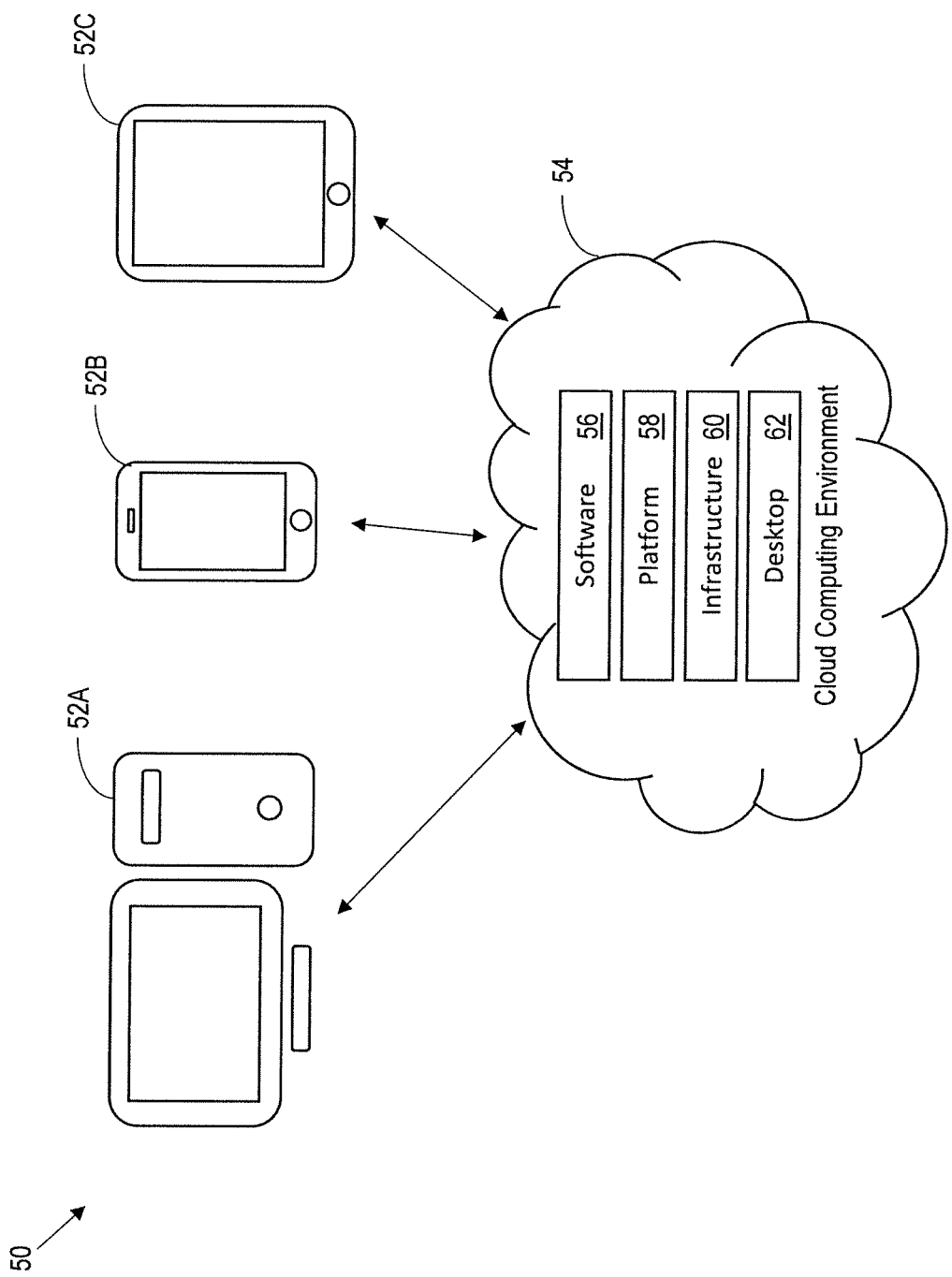
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONEDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
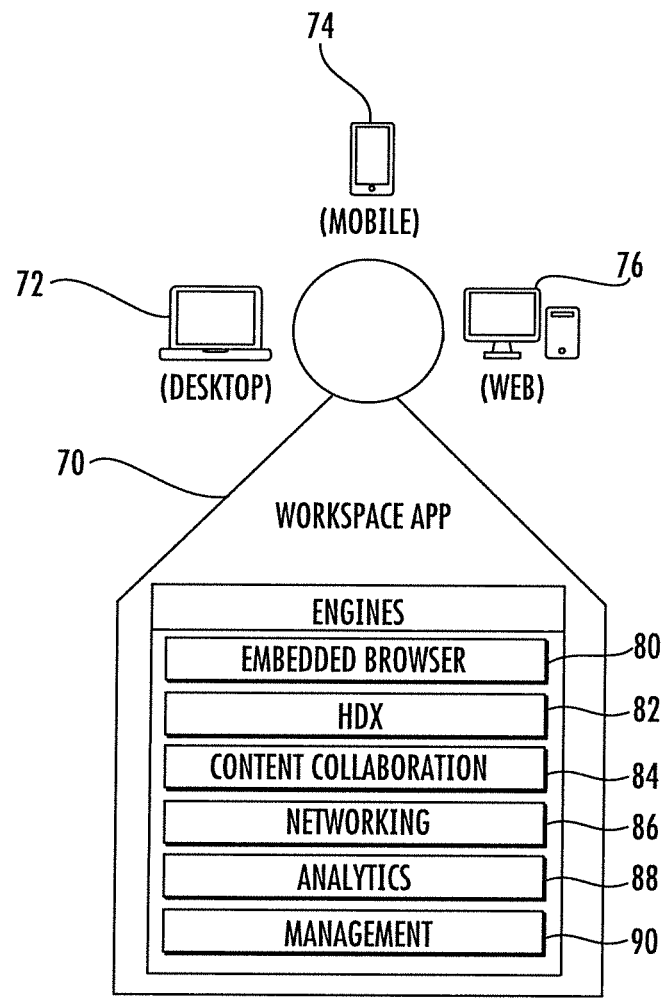
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
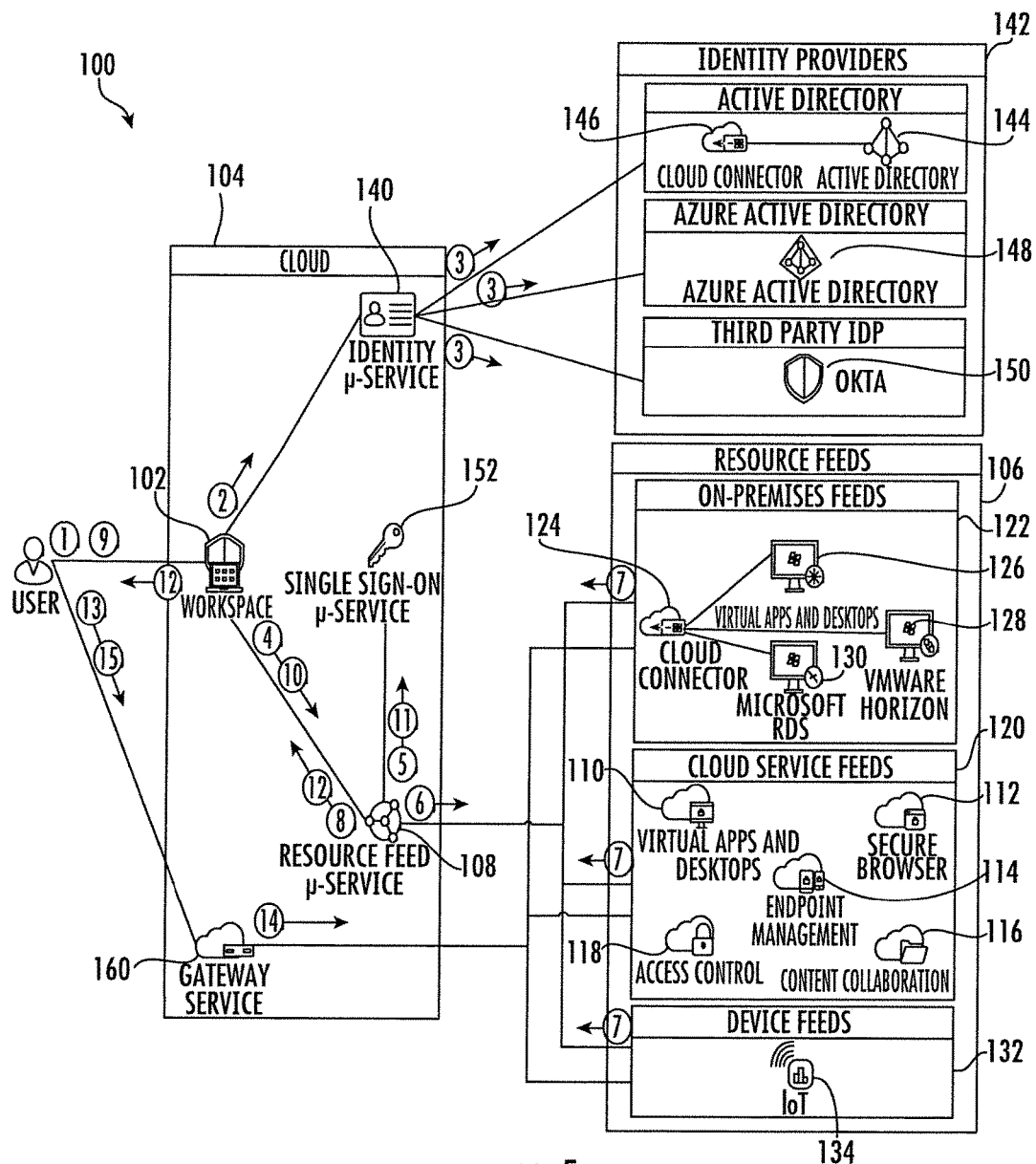
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15).

Having an entire workspace delivered through a single access point or application advantageously improves productivity and streamlines common workflows for the user.

Figure 6:
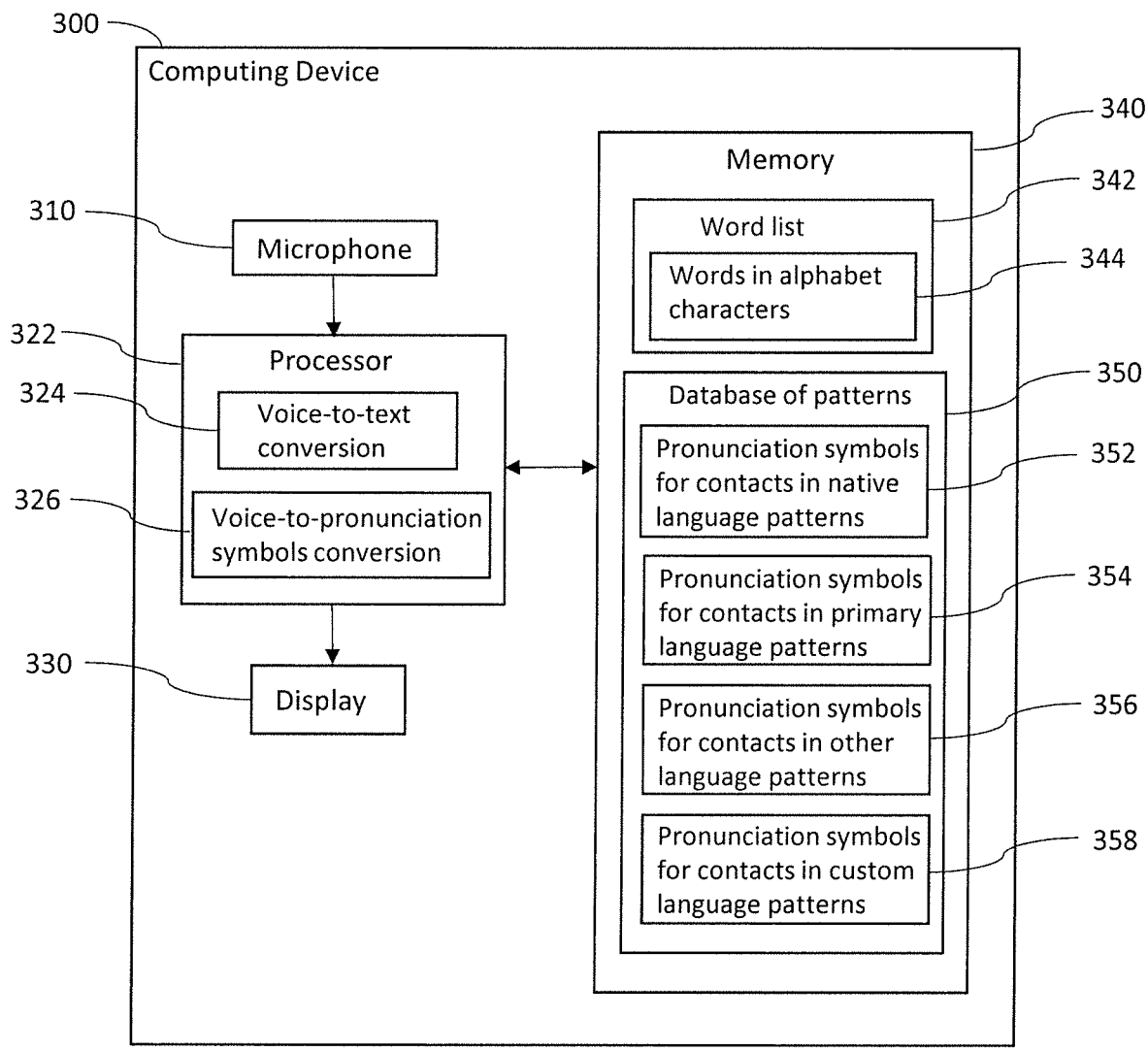
FIG. 6 is a schematic block diagram of a computing device using multi-lingual voice patterns according to aspects of the disclosure.

Referring now to FIG. 6, a computing device 300 that uses multi-lingual voice patterns to search for words 344 in a list 342 will be discussed, wherein the voice patterns are generated from the list 342 and pronounced in different languages. The voice patterns are based on patterns of pronunciation symbols providing a visual representation or cue of speech sounds identifying the words (e.g., contacts) 344 in the list 342. Individual words 344 in the list 342 may be represented by more than one language pattern. The use of different language patterns representing the words 344 in the list 342 improves the robustness of performing an action (e.g., retrieving a contact) regardless of the user's native language and any variations of the user pronouncing the word to be retrieved.

The patterns of pronunciations symbols may be based on the International Phonetic Alphabet (IPA). IPA is a phonetic notation system that uses a set of pronunciation symbols to represent distinct sounds that exists in human spoken languages.

IPA symbols are composed of one or more elements of two basic types, letters and diacritics. A diacritic is a sign, such as an accent or cedilla, which when written above or below a letter indicates a difference in pronunciation from the same letter when unmarked or differently marked. For example, the sound of the English letter ⟨t⟩ may be transcribed in IPA with a single letter, [t], or with a letter plus diacritics, [t̺ʰ], depending on how precise one wishes to be. As another example, pronunciation of the name Baron in English is 'bær.ə n while the Japanese pronunciation is bʌr ɔ n.

The patterns of pronunciation symbols advantageously allow a word (e.g., a contact) 344 to be retrieved when the word cannot be pronounced correctly, as is typically the case with a non-English speaking user. For example, a Chinese employee within an organization may have difficulty pronouncing a word 344 written in alphabet characters, such as when the word is a Spanish or Indian name, for example. If the word 344 is to be searched using alphabet characters, then the search will not be successful since an exact match is required. As an example, if the Indian name Dipankar is to be retrieved but the Chinese employee does not pronounce Dipankar correctly, then the voice-to-text conversion of what the Chinese employee says will not be a match with the name Dipankar in the list 342.

As will be discussed in greater detail below, in response to an unsuccessful attempt to retrieve the word 344 using alphabet characters, the word is converted to a pattern of symbols (e.g., pronunciation symbols). Alternatively, converting the word to a pattern of symbols may be done parallel with the voice-to-text conversion. The pattern of symbols for the converted word is then compared to the pattern of symbols for the different languages representing the words 344 in the list 342 for a match.

Still referring to FIG. 6, the computing device 300 includes a microphone 310 that receives a word (e.g., the name of the contact) 344 to be retrieved from the list 344 as spoken by the user. The list 342 is stored in memory 340, with the words being represented using alphabet characters.

For example, in response to the user speaking a word (e.g., a predetermined word), such as "call" or "email," for example, followed by the name of the contact to be retrieved, a processor 322 coupled to the microphone 310 performs voice-to-text conversion 324 on the spoken name. The voice-to-text conversion 324 converts the spoken name to alphabet characters.

The processor 322 compares the converted word in alphabet characters to the words 344 in the list 342 that are also in alphabet characters. If a match is found, the retrieved word is displayed for user verification. For example, the retrieved word can be a name of a contact and that name is displayed on a display 330 coupled to the processor 322.

To successfully retrieve the word 344 using voice-to-text conversion 324, the word needs to be pronounced correctly by the user. If the word 344 is not pronounced correctly, the word will not be retrieved. An incorrect pronunciation may occur when a non-English speaking user has difficulty pronouncing the word 344 written in alphabet characters because of the speaker's unfamiliarity with the language.

In response to an unsuccessful attempt to retrieve the word 344 in the list 342 based on there not being an exact match between the alphabet characters representing the spoken word to alphabet characters representing the words 344 in the list 342, the processor 322 uses voice-to-pronunciation symbols conversion 326 to convert the spoken word into a pattern of symbols (e.g., pronunciation symbols). The pattern of symbols provide a visual representation of speech sounds identifying the word 344 in the list 342.

The processor 322 compares the pattern of symbols of the converted word to a database 350, which may also be stored in the memory 340. The database 350 may include multi-lingual voice patterns 352-356 representing the words 344 in the list 342 in different languages. The patterns in the database 352-356 are in a format of pronunciation symbols corresponding to the words 344 in the list 342. Individual words 344 in the list 342 may be represented by more than one language pattern.

Individual patterns in the database 350 used in the compare have match values assigned thereto based on being compared to the pattern of symbols of the converted word. The word 344 in the list 342 corresponding to the pattern having the match value that is indicative of a match to the converted word is retrieved for display to the user. This is based on the processor 322 ranking the match values assigned to the patterns used in the compare, and selecting the pattern having a highest ranked match value that exceeds a threshold.

Figure 7:
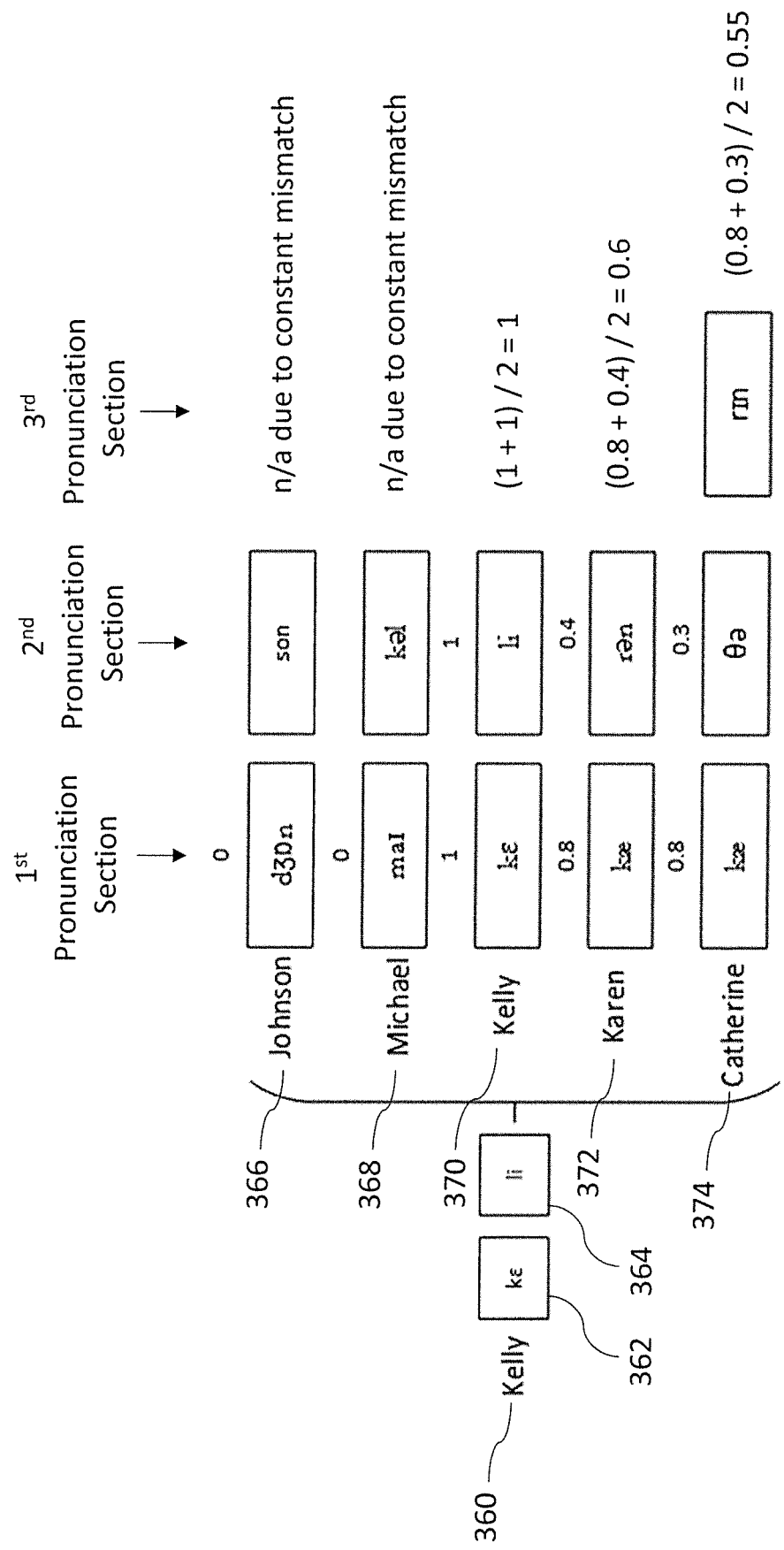
FIG. 7 are results based on determining match values using the computing device illustrated in FIG. 6.

Referring now to FIG. 7, an example retrieval of a word (e.g., a contact) 344 from the list 342 based on determining match values with the patterns of symbols representing the words 344 in the user's list 342 will be discussed. In this example, the patterns of symbols have an English pronunciation.

The word to be retrieved as spoken by the user is Kelly 360. The pattern of pronunciation symbols representing Kelly 360 is Kɛ li. The pattern of symbols for any word may be divided into pronunciation sections. For Kelly 360, Kɛ 362 is the $1^{st}$ pronunciation section and li 364 is the $2^{nd}$ pronunciation section li 364.

The pattern of symbols for Kelly 360 will be compared to the pattern of pronunciation symbols for the following words 344 in the list 342: Johnson 366, Michael 368, Kelly 370, Karen 372 and Catherine 374. Words 366-374 are likewise divided into pronunciation sections. Catherine 374 has three pronunciation sections whereas the other contacts have two pronunciation sections.

Two equations are used to determine the match values. Equation (1) 380 as provided in FIG. 8 is used to determine a value (e.g., a similarity value) for individual pronunciation sections. Equation (2) 390 as provided in FIG. 9 is used to determine the match value (e.g., a combined value) by adding together the similarity values per pronunciation section divided by the number of pronunciation sections in the converted contact to be match, which for Kelly 360 is two pronunciation sections.

The letters in individual pronunciation sections includes a constant, a vowel, and possibly additional constants or vowels. In the $1^{st}$ pronunciation section 362 of Kelly 360, K is the constant and ɛ is the vowel. The $1^{st}$ pronunciation section 362 of Kelly 360 is compared to the $1^{st}$ pronunciation sections for words 366-374.

In the compare, a similarity value for individual letters in the pronunciation section is determined. This is based on equation (1) 380 where for the first letter in the $1^{st}$ pronunciation section, a similarity value is determined which may then be multiplied by a factor (e.g., a weighting factor). The factor is optional, but is reflective of the pronunciation language being used in the compare.

Determining a similarity value is repeated for other letters in the $1^{st}$ pronunciation section of the words 366-374 being compared to the $1^{st}$ pronunciation section 362 in Kelly 360. Similarity values may then be multiplied by a respective factor. The similarity values determined for individual letters are added together for the similarity value to be used in equation (2) 390.

Similarity values based on comparing the $2^{nd}$ pronunciation section li 364 in Kelly 360 to the $2^{nd}$ pronunciation sections of words 366-374 are determined as just discussed for the $1^{st}$ pronunciation sections. Since Kelly 360 has two pronunciation sections and Catherine 374 has three pronunciation sections, the $3^{rd}$ pronunciation section in Catherine 374 is ignored.

To determine the respective match values for individual words 366-374 using the compare, the similarity value for individual pronunciation sections is added together. The total value is then divided by the number of pronunciation sections in the converted word that is to be retrieved, as shown in equation (2) 390. In the example, Kelly 370 has a match value of 1 whereas Karen has a match value of 0.6. The word having the highest match value that exceeds a threshold is selected, which in this case is Kelly 370. The threshold may be 0.8, for example.

Since Kelly 360 matches with Kelly 370 in the list 342, Kelly 370 is retrieved for display to the user. In some cases there may not be an exact match but a partial match when determining the contact to be retired. This variation may be due to how the user is pronouncing the word, such as with an accent or with a dialect that is peculiar to a specific region. As long as the match value exceeds the 0.8 threshold, there will be a high likelihood of a match with the spoken word.

Referring now to the languages supported by the database 350, the languages may be selected, for example, based on employees within an organization that has offices in different countries. For an employee in an office in China, Chinese is the native language of the employee. In this case, the pattern of symbols for words in native language patterns 352 will be in Chinese. The primary language of the organization may be English, for example. In this case, the pattern of symbols for words in primary language patterns 354 will be in English.

The database 350 also supports other languages. In this case, the pattern of symbols for words in other language patterns 356 may be in Spanish, for example. Even though the database 350 includes three different language patterns, additional language patterns may be provided as needed, such as Japanese and Hindi, for example.

Once a match has been made, e.g., Kelly 370, between the converted word Kelly 360 for one of the language patterns 352-356 in the database 350, the processor 322 stores the language pattern providing the match in a custom language patterns section 358 in the database 350. The custom language patterns section 358 advantageously allows this particular word to be more quickly retrieved a next time the user wants to retrieve the same word (e.g., a contact name) by speaking the word.

When performing a search for a word (e.g., a name of a contact), the processor 322 is configured to start the compare with the custom language patterns section 358 for a match with the converted word. For a word previously spoken by the user and matched to one of the language patterns 352-356 in the database 350, the word is more efficiently retrieved from the custom language patterns section 358 since this section of the database has a limited number of entries as compared to the entries in the language patterns 352-356 that could potentially be searched. In response to there not being a match with any of the language patterns in the custom pattern section 358, the processor 322 then continues the compare with the other language patterns 352-356 in the database.

Figure 10:
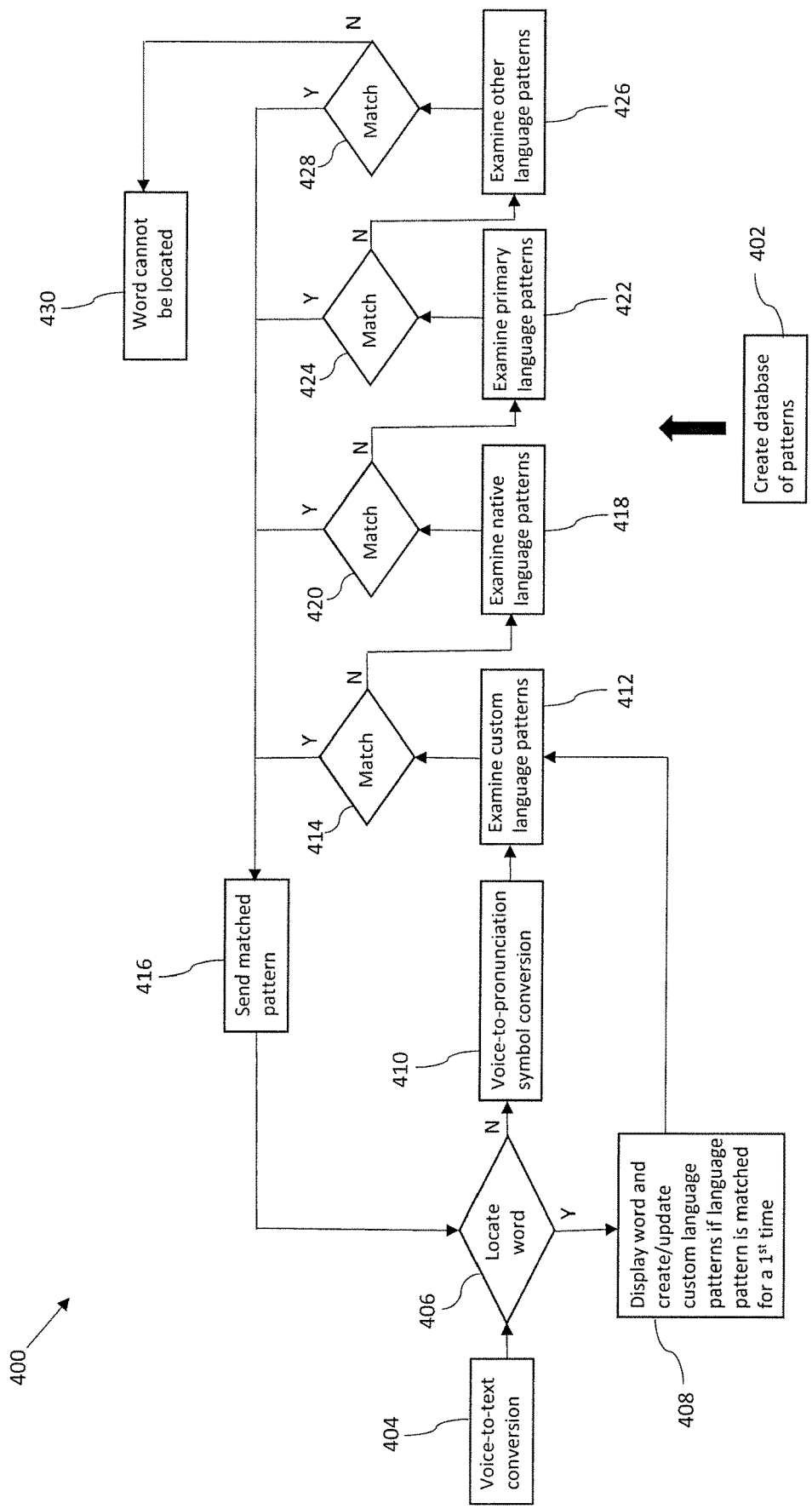
FIG. 10 is a detailed flow diagram for operating the computing device illustrated in FIG. 6.

Referring now to FIG. 10, a detailed flow diagram 400 for operating the computing device 300 will be discussed. Prior to the computing device 300 being used to retrieve a word 344 from the list 342, the database 350 is created at Block 402. The database 350 is created based on the processor 322 converting words 344 in the user's list of content 342 represented by alphabet characters to a pattern of pronunciation symbols 352-356 in different languages.

Individual words 344 in the list 342 may be represented by more than one language pattern. As noted above, the name Baron in English is 'bær.ə n while the Japanese pronunciation is bΛrɔ n. As another example, the name Peterman in English is 'pi:tə mæn.

To search for a word 344, the user speaks into the microphone 310 and says a predetermined prefix, such as "call" or "email", for example, followed by a word (e.g., the name of the contact) 344. The processor 320 executes a voice-to-text conversion 324 at Block 404 to convert the word 344 spoken by the user to text, where the text is based on alphabet characters.

A determination is made at Block 406 as to whether the converted word in alphabet characters can be located in the list 342. If the user pronounced the word correctly, which results in accurate conversion to alphabet characters by the voice-to-text conversion 324, then the word will very likely be retrieved from the list 342. Once retrieved, the word is displayed to the user at Block 408 for verification before the computing device 300 takes some action (e.g., initiating a telephone call or creating an email to the spoken name of a contact).

In response to an unsuccessful attempt to retrieve the word 344 in the list 342 based on using alphabet characters, the spoken word is converted to a pattern of symbols (e.g., pronunciation symbols) by the voice-to-pronunciation symbols conversion 326 at Block 410.

Prior to comparing the pattern of symbols for the converted word to the different language patterns 352-356 for a match, custom language patterns 358 are searched first for a match. The different language patterns 352-356 are sequently searched for a match. That is, if a match is not found with the custom language patterns 358, then the native language patterns 352 will be searched next. This process is repeated with the remaining primary language patterns 354 and the other language patterns 356 until a match is found.

As noted above, there are no entries in the custom language patterns 358 until a word spoken by the user has been matched with one of the language patterns 352-356.

A determination is made at Block 414 on if there is a match for a word previously spoken by the user with an entry in the custom language patterns 358. If a match is found at Block 414, then the matched pattern of symbols, as represented by Block 416, is sent back to Block 406. This causes the retrieved word corresponding to the matched pattern of symbols to be displayed at Block 408. If a match is not found using the language patterns 358 at Block 414, then the process continues to Block 418.

At Block 418, the converted word is compared to the pattern of symbols in native language patterns 352. For a Chinese speaking user, the native language patterns 352 are in Chinese. A determination is made at Block 420 for a match with one of the native language patterns 352.

If a match is found at Block 420, then the matched pattern of symbols, as represented by Block 416, is sent back to Block 406. This causes the retrieved word corresponding to the matched pattern of symbols to be displayed at Block 408. If this is a first time matching the spoken word with one of the native language patterns 352, then the custom language patterns 358 is updated at Block 408 with the newly matched pattern. If a match is not found using the native language patterns 352, then the process continues to Block 422.

At Block 422, the converted word is compared to the pattern of symbols in primary language patterns 354. For an organization with offices in different countries, the primary language of the organization may be English. A determination is made at Block 424 for a match with one of the primary language patterns 354.

If a match is found at Block 424, then the matched pattern of symbols, as represented by Block 416, is sent back to Block 406. This causes the retrieved word corresponding to the matched pattern of pronunciation symbols to be displayed at Block 408. If this is a first time matching the spoken word with one of the primary language patterns 354, then the custom language patterns 358 is updated at Block 408 with the newly matched pattern. If a match is not found using the primary language patterns 354 at Block 424, then the process continues to Block 426.

At Block 426, the converted word is compared to the pattern of pronunciation symbols in other language patterns 356. For the organization with offices in different countries, other languages besides English and Chinese used within the organization may selected for the other language patterns 356, such as Spanish or Japanese, for example. A determination is made at Block 428 on if there is a match with one of the other language patterns 356.

If a match is found at Block 428, then the matched pattern of symbols, as represented by Block 416, is sent back to Block 406. This causes the retrieved word corresponding to the matched pattern of pronunciation symbols to be displayed at Block 408. If this is a first time matching the spoken word with one of the other language patterns 356, then the language patterns 358 is updated at Block 408 with the newly matched pattern. If a match is not found using the other language patterns 356 at Block 428, then the process continues to Block 430 which displays to the user that a word cannot be located.

Figure 11:
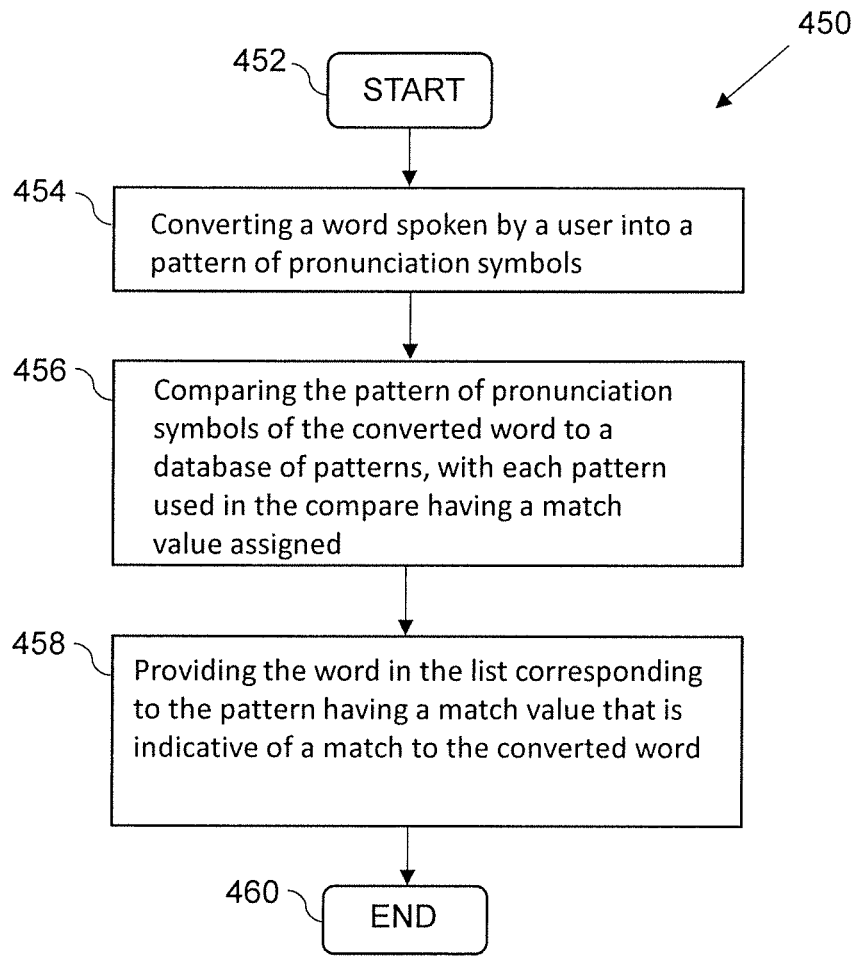
FIG. 11 is a high-level flow diagram for operating the computing device illustrated in FIG. 6.

Referring now to FIG. 11, a high-level flow diagram 450 for operating the computing device 300 will be discussed. From the start (Block 452), a word spoken by a user is converted into a pattern of pronunciation symbols at Block 454. This is in response to an unsuccessful attempt to retrieve the word 344 in a list 342. As noted above, the pattern of symbols provide a visual representation of speech sounds identifying the word in the list.

The pattern of symbols of the converted word are compared to a database 350 at Block 456. The patterns in the database are in a format of symbols corresponding to the words in the list. Individual patterns used in the comparison has a match value assigned thereto, as discussed above for Kelly 360, based on being compared to the pattern of symbols of the converted word. The word in the list corresponding to the pattern having the match value that is indicative of a match to the converted word is provided at Block 458. The method ends at Block 460.

Example implementations of methods, computing devices and computer-readable media in accordance with the present disclosure will now be provided.

The following paragraphs (M1) through (M12) describe examples of methods that may be implemented in accordance with the present disclosure.

(M1) A method include converting, based on rules, a word spoken by a user into a pattern of symbols in response to an unsuccessful attempt to retrieve the word in a list, with the pattern of symbols providing a visual representation of speech sounds identifying the word in the list. The pattern of symbols of the converted word are compared to a database of patterns, with the patterns in the database being in a format of symbols corresponding to the words in the list, and with each pattern used in the compare having a match value assigned thereto based on being compared to the pattern of symbols of the converted word. The word in the list corresponding to the pattern having the match value that is indicative of a match to the converted word is provided to the user.

(M2) A method as described in paragraph (M1), wherein the word spoken by the user is converted into alphabet characters before converting into the pattern of pronunciation symbols, and wherein the unsuccessful attempt to retrieve the word in the list is based on there not being a match between the alphabet characters representing the spoken word to alphabet characters representing the words in the list.

(M3) A method as described in any of paragraphs (M1) through (M2), further including ranking the match values assigned to the patterns used in the compare, and selecting the pattern having a highest ranked match value that exceeds a threshold.

(M4) A method as described in any of paragraphs (M1) through (M3), wherein the patterns in the database comprise a plurality of multi-lingual patterns, with each language pattern in the multi-lingual patterns being based on a particular language pronunciation of the word in the list, and with each word in the list being represented by more than one language pattern.

(M5) A method as described in any of paragraphs (M1) through (M4), wherein the comparing starts with a first one of language patterns having a particular language pronunciation, and in response to there not being a match, repeats the comparing with a second one of the language patterns having a different particular language pronunciation.

(M6) A method as described in any of paragraphs (M1) through (M5), wherein in response to there being a match with one of the language patterns having a particular language pronunciation, further includes adding the language pattern providing the match to a custom pattern section in the database, and for a next time a word is spoken by the user for retrieval, starting the compare using the language pattern in the custom pattern section. In response to there not being a match with the language pattern in the custom pattern section, continuing the compare with the other language patterns in the database.

(M7) A method as described in any of paragraphs (M1) through (M6), wherein performing the compare includes dividing the pattern of pronunciation symbols into pronunciation sections for the converted word, dividing the pattern of pronunciation symbols into pronunciation sections for each pattern in the database used in the compare, and comparing the pronunciation sections for the converted word to the corresponding pronunciation sections for each pattern used in the compare.

(M8) A method as described in any of paragraphs (M1) through (M7), wherein the matching value assigned to each pattern used in the compare is based on a respective similarity value assigned to each pronunciation section.

(M9) A method as described in any of paragraphs (M1) through (M8), wherein the matching value assigned to each pattern is determined by adding the respective similarity values assigned to the pronunciation sections for the pattern, and dividing the added respective similarity values by a number of the pronunciation sections in the converted word.

(M10) A method as described in any of paragraphs (M1) through (M9), wherein each pronunciation section comprises a plurality of letters, and wherein the respective similarity value assigned to each pronunciation section for the pattern used in the compare is based on the following: determining a similarity value for each letter in the pronunciation section for the pattern used in the compare, multiplying the similarity value for each letter in the pronunciation section by a respective weighting factor, and adding together the determined similarity value for each letter multiplied by the respective weighting factor to determine the similarity value assigned to each pronunciation section.

(M11) A method as described in any of paragraphs (M1) through (M10), wherein the rules for converting the word into a pattern of pronunciation symbols are based on an international phonetic alphabet (IPA).

(M12) A method as described in any of paragraphs (M1) through (M11), wherein retrieval of the word spoken is initiated by the user in response to the user speaking a predetermined word.

The following paragraphs (S1) through (S12) describe examples of computing devices that may be implemented in accordance with the present disclosure.

(S1) A computing device includes a memory and a processor configured to cooperate with the memory. The processor is configured to convert, based on rules, a word spoken by a user into a pattern of pronunciation symbols in response to an unsuccessful attempt to retrieve the word in a list. The pattern of pronunciation symbols provides a visual representation of speech sounds identifying the word in the list. The pattern of pronunciation symbols of the converted word are compared to a database of patterns, with the patterns in the database being in a format of pronunciation symbols corresponding to the words in the list. Each pattern used in the compare has a match value assigned thereto based on being compared to the pattern of pronunciation symbols of the converted word. The word in the list corresponding to the pattern having the match value that is indicative of a match to the converted word is provided to the user.

(S2) A computing device as described in paragraph (S1), wherein the word spoken by the user is converted into alphabet characters before converting into the pattern of pronunciation symbols, and wherein the unsuccessful attempt to retrieve the word in the list is based on there not being a match between the alphabet characters representing the spoken word to alphabet characters representing the words in the list.

(S3) A computing device as described in any of paragraphs (S1) through (S2), further including ranking the match values assigned to the patterns used in the compare, and selecting the pattern having a highest ranked match value that exceeds a threshold.

(S4) A computing device as described in any of paragraphs (S1) through (S3), wherein the patterns in the database comprise a plurality of multi-lingual patterns, with each language pattern in the multi-lingual patterns being based on a particular language pronunciation of the word in the list, and with each word in the list being represented by more than one language pattern.

(S5) A computing device as described in any of paragraphs (S1) through (S4), wherein the comparing starts with a first one of language patterns having a particular language pronunciation, and in response to there not being a match, repeats the comparing with a second one of the language patterns having a different particular language pronunciation.

(S6) A computing device as described in any of paragraphs (S1) through (S5), wherein in response to there being a match with one of the language patterns having a particular language pronunciation, further includes adding the language pattern providing the match to a custom pattern section in the database, and for a next time a word is spoken by the user for retrieval, starting the compare using the language pattern in the custom pattern section. In response to there not being a match with the language pattern in the custom pattern section, continuing the compare with the other language patterns in the database.

(S7) A computing device as described in any of paragraphs (S1) through (S6), wherein performing the compare includes dividing the pattern of pronunciation symbols into pronunciation sections for the converted word, dividing the pattern of pronunciation symbols into pronunciation sections for each pattern in the database used in the compare, and comparing the pronunciation sections for the converted word to the corresponding pronunciation sections for each pattern used in the compare.

(S8) A computing device as described in any of paragraphs (S1) through (S7), wherein the matching value assigned to each pattern used in the compare is based on a respective similarity value assigned to each pronunciation section.

(S9) A computing device as described in any of paragraphs (S1) through (S8), wherein the matching value assigned to each pattern is determined by adding the respective similarity values assigned to the pronunciation sections for the pattern, and dividing the added respective similarity values by a number of the pronunciation sections in the converted word.

(S10) A computing device as described in any of paragraphs (S1) through (S9), wherein each pronunciation section comprises a plurality of letters, and wherein the respective similarity value assigned to each pronunciation section for the pattern used in the compare is based on the following: determining a similarity value for each letter in the pronunciation section for the pattern used in the compare, multiplying the similarity value for each letter in the pronunciation section by a respective weighting factor, and adding together the determined similarity value for each letter multiplied by the respective weighting factor to determine the similarity value assigned to each pronunciation section.

(S11) A computing device as described in any of paragraphs (S1) through (S10), wherein the rules for converting the word into a pattern of pronunciation symbols are based on an international phonetic alphabet (IPA).

(S12) A computing device as described in any of paragraphs (S1) through (S11), wherein retrieval of the word spoken is initiated by the user in response to the user speaking a predetermined word.

The following paragraphs (CRM1) through (CRM12) describe examples of computer-readable media that may be implemented in accordance with the present disclosure.

(CRM1) A computer-readable medium for a computing device includes a plurality of computer executable instructions which, when executed, causes the computing device to convert, based on rules, a word spoken by a user into a pattern of pronunciation symbols in response to an unsuccessful attempt to retrieve the word in a list. The pattern of pronunciation symbols provides a visual representation of speech sounds identifying the word in the list. The pattern of pronunciation symbols of the converted word are compared to a database of patterns, with the patterns in the database being in a format of pronunciation symbols corresponding to the words in the list. Each pattern used in the compare has a match value assigned thereto based on being compared to the pattern of pronunciation symbols of the converted word. The word in the list corresponding to the pattern having the match value that is indicative of a match to the converted word is provided to the user.

(CRM2) A computer-readable medium as described in paragraph (CRM1), wherein the word spoken by the user is converted into alphabet characters before converting into the pattern of pronunciation symbols, and wherein the unsuccessful attempt to retrieve the word in the list is based on there not being a match between the alphabet characters representing the spoken word to alphabet characters representing the words in the list.

(CRM3) A computer-readable medium as described in any of paragraphs (CRM1) through (CRM2), further including ranking the match values assigned to the patterns used in the compare, and selecting the pattern having a highest ranked match value that exceeds a threshold.

(CRM4) A computer-readable medium as described in any of paragraphs (CRM1) through (CRM3), wherein the patterns in the database comprise a plurality of multi-lingual patterns, with each language pattern in the multi-lingual patterns being based on a particular language pronunciation of the word in the list, and with each word in the list being represented by more than one language pattern.

(CRMS) A computer-readable medium as described in any of paragraphs (CRM1) through (CRM4), wherein the comparing starts with a first one of language patterns having a particular language pronunciation, and in response to there not being a match, repeats the comparing with a second one of the language patterns having a different particular language pronunciation.

(CRM6) A computer-readable medium as described in any of paragraphs (CRM1) through (CRMS), wherein in response to there being a match with one of the language patterns having a particular language pronunciation, further includes adding the language pattern providing the match to a custom pattern section in the database, and for a next time a word is spoken by the user for retrieval, starting the compare using the language pattern in the custom pattern section. In response to there not being a match with the language pattern in the custom pattern section, continuing the compare with the other language patterns in the database.

(CRM7) A computer-readable medium as described in any of paragraphs (CRM1) through (CRM6), wherein performing the compare includes dividing the pattern of pronunciation symbols into pronunciation sections for the converted word, dividing the pattern of pronunciation symbols into pronunciation sections for each pattern in the database used in the compare, and comparing the pronunciation sections for the converted word to the corresponding pronunciation sections for each pattern used in the compare.

(CRM8) A computer-readable medium as described in any of paragraphs (CRM1) through (CRM7), wherein the matching value assigned to each pattern used in the compare is based on a respective similarity value assigned to each pronunciation section.

(CRM9) A computer-readable medium as described in any of paragraphs (CRM1) through (CRM8), wherein the matching value assigned to each pattern is determined by adding the respective similarity values assigned to the pronunciation sections for the pattern, and dividing the added respective similarity values by a number of the pronunciation sections in the converted word.

(CRM10) A computer-readable medium as described in any of paragraphs (CRM1) through (CRM9), wherein each pronunciation section comprises a plurality of letters, and wherein the respective similarity value assigned to each pronunciation section for the pattern used in the compare is based on the following: determining a similarity value for each letter in the pronunciation section for the pattern used in the compare, multiplying the similarity value for each letter in the pronunciation section by a respective weighting factor, and adding together the determined similarity value for each letter multiplied by the respective weighting factor to determine the similarity value assigned to each pronunciation section.

(CRM11) A computer-readable medium as described in any of paragraphs (CRM1) through (CRM10), wherein the rules for converting the word into a pattern of pronunciation symbols are based on an international phonetic alphabet (IPA).

(CRM12) A computer-readable medium as described in any of paragraphs (CRM1) through (CRM11), wherein retrieval of the word spoken is initiated by the user in response to the user speaking a predetermined word.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A method comprising:
    converting, based on rules, a word spoken by a user into a pattern of symbols in response to an unsuccessful attempt to retrieve the word in a list, with the pattern of symbols providing a visual representation of speech sounds identifying the word in the list;
    comparing the pattern of symbols of the converted word to a database of patterns, with the patterns in the database being in a format of symbols corresponding to the words in the list, and with each pattern used in the compare having a match value assigned thereto based on being compared to the pattern of symbols of the converted word, wherein comparing the pattern of symbols comprises:
        dividing the pattern of symbols into pronunciation sections for the converted word, each pronunciation section corresponding to a syllable in the converted word;
        dividing the pattern of symbols into pronunciation sections for each pattern in the database used in the compare; and
        comparing the pronunciation sections for the converted word to the corresponding pronunciation sections for each pattern used in the compare; and
    providing the word in the list corresponding to the pattern having the match value that is indicative of a match to the converted word.

2. The method according to claim 1, wherein the word spoken by the user is converted into alphabet characters before converting into the pattern of pronunciation symbols, and wherein the unsuccessful attempt to retrieve the word in the list is based on there not being a match between the alphabet characters representing the spoken word to alphabet characters representing the word in the list.

3. The method according to claim 1, further comprising:
    ranking the match values assigned to the patterns used in the compare; and
    selecting the pattern having a highest ranked match value that exceeds a threshold.

4. The method according to claim 1, wherein the patterns in the database comprise a plurality of multi-lingual patterns, with each language pattern in the multi-lingual patterns being based on a particular language pronunciation of the word in the list, and with each word in the list being represented by more than one language pattern.

5. The method according to claim 4, wherein the comparing starts with a first one of language patterns having a particular language pronunciation, and in response to there not being a match, repeats the comparing with a second one of the language patterns having a different particular language pronunciation.

6. The method according to claim 4, wherein in response to there being a match with one of the language patterns having a particular language pronunciation, further comprising:
    adding the language pattern providing the match to a custom pattern section in the database;
    for a next time a word is spoken by the user for retrieval, starting the compare using the language pattern in the custom pattern section; and
    in response to there not being a match with the language pattern in the custom pattern section, continuing the compare with the other language patterns in the database.

7. The method according to claim 1, wherein the matching value assigned to each pattern used in the compare is based on a respective similarity value assigned to each pronunciation section.

8. The method according to claim 7, wherein the matching value assigned to each pattern is determined by adding the respective similarity values assigned to the pronunciation sections for the pattern, and dividing the added respective similarity values by a number of the pronunciation sections in the converted word.

9. The method according to claim 7, wherein each pronunciation section comprises a plurality of letters, and wherein the respective similarity value assigned to each pronunciation section for the pattern used in the compare is based on the following:
    determining a similarity value for each letter in the pronunciation section for the pattern used in the compare;
    multiplying the similarity value for each letter in the pronunciation section by a respective weighting factor; and
    adding together the determined similarity value for each letter multiplied by the respective weighting factor to determine the similarity value assigned to each pronunciation section.

10. The method according to claim 1, wherein the rules for converting the word into a pattern of pronunciation symbols are based on an international phonetic alphabet (IPA).

11. The method according to claim 1, wherein retrieval of the word spoken is initiated by the user in response to the user speaking a predetermined word.

12. A computing device comprising:
    a memory and a processor configured to cooperate with said memory to perform the following:
        convert, based on rules, a word spoken by a user into a pattern of pronunciation symbols in response to an unsuccessful attempt to retrieve the word in a list, with the pattern of pronunciation symbols providing a visual representation of speech sounds identifying the word in the list;
        compare the pattern of pronunciation symbols of the converted word to a database of patterns, with the patterns in the database being in a format of pronunciation symbols corresponding to the words in the list, and with each pattern used in the compare having a match value assigned thereto based on being compared to the pattern of pronunciation symbols of the converted word, by:
            dividing the pattern of symbols into pronunciation sections for the converted word, each pronunciation section corresponding to a syllable in the converted word;
            dividing the pattern of symbols into pronunciation sections for each pattern in the database used in the compare; and
            comparing the pronunciation sections for the converted word to the corresponding pronunciation sections for each pattern used in the compare; and
        provide the word in the list corresponding to the pattern having the match value that is indicative of a match to the converted word.

13. The computing device according to claim 12, wherein said processor is configured to convert a contact spoken by the user into alphabet characters before converting into the pattern of pronunciation symbols, and wherein the unsuccessful attempt to retrieve the contact in a contact list is based on there not being a match between the alphabet characters representing the spoken contact to the alphabet characters representing the contacts in the contact list.

14. The computing device according to claim 12, wherein said processor is configured to perform the following:
- rank the match values assigned to the patterns used in the compare; and
- select the pattern having a highest ranked match value that exceeds a threshold.

15. The computing device according to claim 12, wherein the patterns in the database comprise a plurality of multi-lingual patterns, with each language pattern in the multi-lingual patterns being based on a particular language pronunciation of a contact in a contact list, and with each contact in the contact list being represented by more than one language pattern.

16. The computing device according to claim 12, wherein the matching value assigned to each pattern used in the compare is based on a respective similarity value assigned to each pronunciation section.

17. The computing device according to claim 12, wherein the rules for converting a contact into a pattern of pronunciation symbols are based on an international phonetic alphabet (IPA).

18. The computing device according to claim 12, wherein each pronunciation section comprises a plurality of letters, and wherein the processor is configured to determine the respective similarity value assigned to each pronunciation section for the pattern used in the compare by:
- determining a similarity value for each letter in the pronunciation section for the pattern used in the compare;
- multiplying the similarity value for each letter in the pronunciation section by a respective weighting factor; and
- adding together the determined similarity value for each letter multiplied by the respective weighting factor to determine the similarity value assigned to each pronunciation section.

19. The computing device according to claim 15, wherein the processor is further configured to perform:
- adding the language pattern providing the match to a custom pattern section in the database;
- for a next time a word is spoken by the user for retrieval, starting the compare using the language pattern in the custom pattern section; and
- in response to there not being a match with the language pattern in the custom pattern section, continuing the compare with the other language patterns in the database.

20. A non-transitory computer readable medium for a computing device, and with the non-transitory computer readable medium having a plurality of computer executable instructions for causing the computing device to perform steps comprising:
- converting, based on rules, a word spoken by a user into a pattern of pronunciation symbols in response to an unsuccessful attempt to retrieve the word in a list, with the pattern of pronunciation symbols providing a visual representation of speech sounds identifying the word in the list;
- comparing the pattern of pronunciation symbols of the converted word to a database of patterns, with the patterns in the database being in a format of pronunciation symbols corresponding to the words in the list, and with each pattern used in the compare having a match value assigned thereto based on being compared to the pattern of pronunciation symbols of the converted word, wherein comparing the pattern of symbols comprises:
  - dividing the pattern of pronunciation symbols into pronunciation sections for the converted word, each pronunciation section corresponding to a syllable in the converted word;
  - dividing the pattern of pronunciation symbols into pronunciation sections for each pattern in the database used in the compare; and
  - comparing the pronunciation sections for the converted word to the corresponding pronunciation sections for each pattern used in the compare; and
- providing the word in the list corresponding to the pattern having the match value that is indicative of a match to the converted word.

* * * * *